(12) United States Patent
Akerib

(10) Patent No.: US 12,079,478 B2
(45) Date of Patent: Sep. 3, 2024

(54) SYSTEM AND METHOD FOR RANDOM DATA DISTRIBUTION IN A MEMORY ARRAY

(71) Applicant: GSI Technology Inc., Sunnyvale, CA (US)

(72) Inventor: Avidan Akerib, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 10 days.

(21) Appl. No.: 18/067,744

(22) Filed: Dec. 19, 2022

(65) Prior Publication Data

US 2024/0201852 A1 Jun. 20, 2024

(51) Int. Cl.
*G06F 3/06* (2006.01)

(52) U.S. Cl.
CPC ............ *G06F 3/061* (2013.01); *G06F 3/0659* (2013.01); *G06F 3/0679* (2013.01)

(58) Field of Classification Search
CPC ....... G06F 3/061; G06F 3/0659; G06F 3/0679
See application file for complete search history.

(56) References Cited

U.S. PATENT DOCUMENTS

| | | | | |
|---|---|---|---|---|
| 9,076,527 B2 * | 7/2015 | Agam | ................... | G11C 8/08 |
| 9,558,812 B2 | 1/2017 | Akerib | | |
| 10,832,746 B2 | 11/2020 | Akerib | | |
| 2004/0201400 A1 * | 10/2004 | Herr | ................... | G11C 11/44 326/3 |
| 2007/0299737 A1 * | 12/2007 | Plastina | ............. | G06Q 30/0633 705/14.1 |
| 2013/0019215 A1 | 1/2013 | Swann | | |
| 2015/0154116 A1 | 6/2015 | Dittrich | | |
| 2021/0173557 A1 | 6/2021 | Mai | | |
| 2022/0013173 A1 | 1/2022 | Tortorelli | | |

OTHER PUBLICATIONS

International Search Report for corresponding International application PCT/US23/83941 mailed on Apr. 2, 2024.

* cited by examiner

*Primary Examiner* — Larry T Mackall
(74) *Attorney, Agent, or Firm* — HEIDI BRUN ASSOCIATES LTD.

(57) ABSTRACT

A method for random data distribution in a memory array from a source row to a destination row includes receiving a plurality of pairs of addresses, where each pair includes a source address of a source cell in the source row and a destination addresses of a destination cell in a destination row, storing the source address in cells of a column associated with the destination cell, creating a Boolean algebra expression defining a correlation between each one of the source addresses and a value stored in each one of the source cells, where applying the Boolean algebra expression on any one of the source addresses provides a value of one of the source cells, concurrently applying the Boolean algebra expression on a plurality of columns storing the source addresses and concurrently writing a plurality of results on the destination row.

10 Claims, 8 Drawing Sheets

| | A | B | C | D | Bit Value |
|---|---|---|---|---|---|
| 0 | 0 | 0 | 0 | 0 | 0 |
| 1 | 0 | 0 | 0 | 1 | 0 |
| 2 | 0 | 0 | 1 | 0 | 1 |
| 3 | 0 | 0 | 1 | 1 | 0 |
| 4 | 0 | 1 | 0 | 0 | 0 |
| 5 | 0 | 1 | 0 | 1 | 0 |
| 6 | 0 | 1 | 1 | 0 | 1 |
| 7 | 0 | 1 | 1 | 1 | 1 |
| 8 | 1 | 0 | 0 | 0 | 0 |
| 9 | 1 | 0 | 0 | 1 | 1 |
| 10 | 1 | 0 | 1 | 0 | 1 |
| 11 | 1 | 0 | 1 | 1 | 1 |
| 12 | 1 | 1 | 0 | 0 | 0 |
| 13 | 1 | 1 | 0 | 1 | 0 |
| 14 | 1 | 1 | 1 | 0 | 1 |
| 15 | 1 | 1 | 1 | 1 | 0 |

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A | 0 | 0 | 1 | 1 | 1 | 1 | 0 | 0 | 0 | 0 | 1 | 1 | 1 | 1 | 0 | 0 |
| B | 0 | 1 | 1 | 0 | 0 | 1 | 1 | 0 | 0 | 1 | 1 | 0 | 0 | 1 | 1 | 0 |
| C | 0 | 0 | 0 | 0 | 0 | 0 | 0 | 0 | 1 | 1 | 1 | 1 | 1 | 1 | 1 | 1 |
| D | 0 | 0 | 0 | 0 | 1 | 1 | 1 | 1 | 1 | 1 | 1 | 1 | 0 | 0 | 0 | 0 |
|  | 0 | 0 | 0 | 0 | 1 | 0 | 0 | 0 | 0 | 1 | 0 | 1 | 1 | 1 | 1 | 1 |

AB'C'D     A'BCD   AB'CD    CD'

FIG. 8B

SYSTEM AND METHOD FOR RANDOM DATA DISTRIBUTION IN A MEMORY ARRAY

FIELD OF THE INVENTION

The present invention relates to data distribution in memory generally and to random data distribution in a memory unit equipped with a multiple row decoder and a multiple column decoder in particular.

BACKGROUND OF THE INVENTION

Most cryptographic applications require random numbers, for example in key generation, nonces, salts in certain signature schemes and the like. Ideally, the generation of random numbers uses entropy obtained from a high-quality source, such as the operating system's randomness application programming interface (API); however, the processes to extract randomness from a running system are slow.

It is also possible to use the data stored in the memory to generate random numbers. This can, for example, be achieved by receiving a set of bit addresses in a random row in the memory array from which the values can be copied. In a standard memory array, it is possible to move bits from specific locations in one memory row to new locations in the memory row using a shift operation. The shift operation moves each bit in the row from its original location (a specific cell in a row in the memory) one or more locations to the right or to the left. In each shift operation, the entire row is shifted, i.e., all bits in the row move to the left or to the right.

Figure 1:
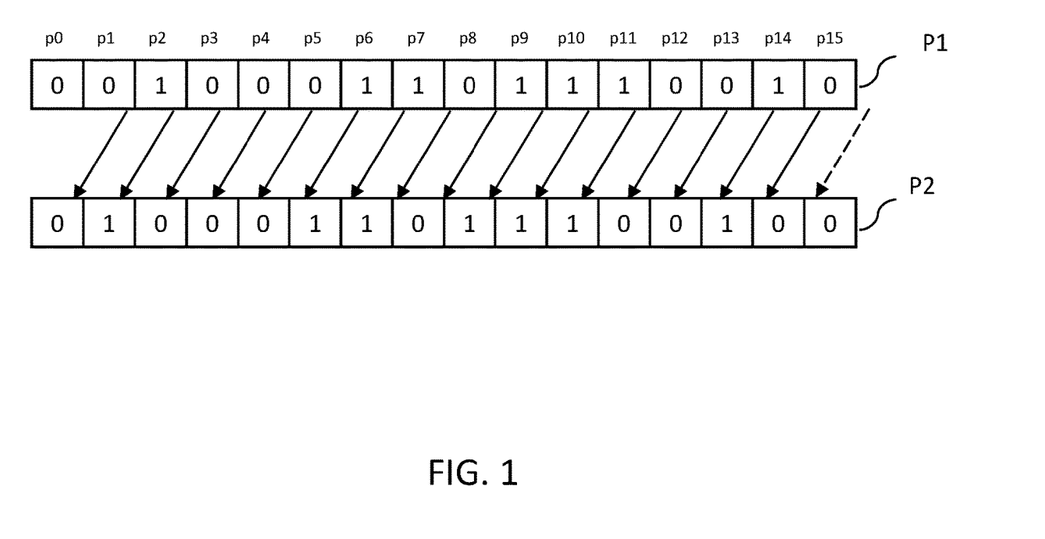
FIG. 1 is a schematic illustration of an exemplary portion of a row of a memory array storing 16 bits before and after a shift operation.

FIG. 1, to which reference is now made, is a schematic illustration of an exemplary portion of a row P capable of storing 16 bits in 16 cells p0, p1, . . . p15 before and after a shift operation. Row P1 illustrates the original value of row P and row P2 illustrates the value of row P after a "one left" shift operation. It may be noted that the value of all cells in row P2 are shifted one location to the left compared to row P1, i.e., cell p0 in row P2 has the value of cell p1 in row P1, the value of cell p1 in row p2 has the value of cell p2 and so on. Cell p15 is the last cell in row P and therefore, there is no cell from which its value can be taken. Accordingly, its value is set to zero. When data is to be randomly distributed, i.e., the value of several individual bits should be copied to another location in memory, it is possible to use bit shift for each such individual bit, which is a long and expensive operation in terms of time and computation resources.

SUMMARY OF THE PRESENT INVENTION

There is provided in accordance with an embodiment of the present invention a method for random data distribution in a memory array from a source row to a destination row. The method includes receiving a plurality of pairs of addresses, where each pair includes a source address of a source cell in the source row and a destination addresses of a destination cell in a destination row, in each pair a value stored in the source cell is to be distributed to the destination cell and for each one of the plurality of pairs, storing the source address in cells of a column associated with the destination cell, creating a Boolean algebra expression defining a correlation between each one of the source addresses and a value stored in each one of the source cells, where applying the Boolean algebra expression on any one of the source addresses provides a value of one of the source cells and concurrently applying the Boolean algebra expression on a plurality of columns storing the source addresses and concurrently writing a plurality of results on the destination row, thus distributing data from the source row to the destination row.

Additionally, in accordance with an embodiment of the present invention, the step of applying the Boolean algebra expression further includes concurrently activating a plurality of rows in the memory array.

Furthermore, in accordance with an embodiment of the present invention, the memory array includes non-volatile memory cells.

Still further, in accordance with an embodiment of the present invention, the memory array includes non-destructive memory cells.

Moreover, in accordance with an embodiment of the present invention, the cells storing the source address and the destination cell are in the same column of the multiple bit-processor unit.

Additionally, in accordance with an embodiment of the present invention, the step of creating a Boolean algebra expression includes using a Karnaugh map.

There is provided in accordance with an embodiment of the present invention a system for random data distribution from a plurality of source cells to a plurality of destination cells, the system includes a memory array contains cells arranged in rows and columns, a multiple bit-processor unit storing a plurality of source addresses of the plurality of the source cells in a plurality of columns, each source address in a column associated with one of the destination cells, a Boolean expression builder to build a Boolean expression describing an association between the source addresses and a plurality of source values stored in the source cells and a data distributor to concurrently activate a plurality of cells on the columns according to the Boolean expression and to write a result provided on each one of the columns to one of the plurality of destination cell associated with one of the columns.

Additionally, in accordance with an embodiment of the present invention, the multiple bit-processor unit includes a multiple row decoder to concurrently select a plurality of rows of the memory array according to the Boolean expression.

Furthermore, in accordance with an embodiment of the present invention, the memory array includes non-volatile memory cells.

Still further, in accordance with an embodiment of the present invention, the memory array includes non-destructive memory cells.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Generating random numbers may be done by distributing random bits from one memory location to another. Applicant has realized that in-memory Boolean operations, natively supported by a device equipped with a multiple row decoder and a multiple column decoder like the associative processing unit (APU), commercially available from GSI Technology Inc. of the USA, may be used to distribute the value of cells from specified addresses in a source row to specified addresses in a destination row by creating a Boolean algebra expression that describes the correlation between the set of addresses of row A that needs to be copied and their content.

Figure 2:
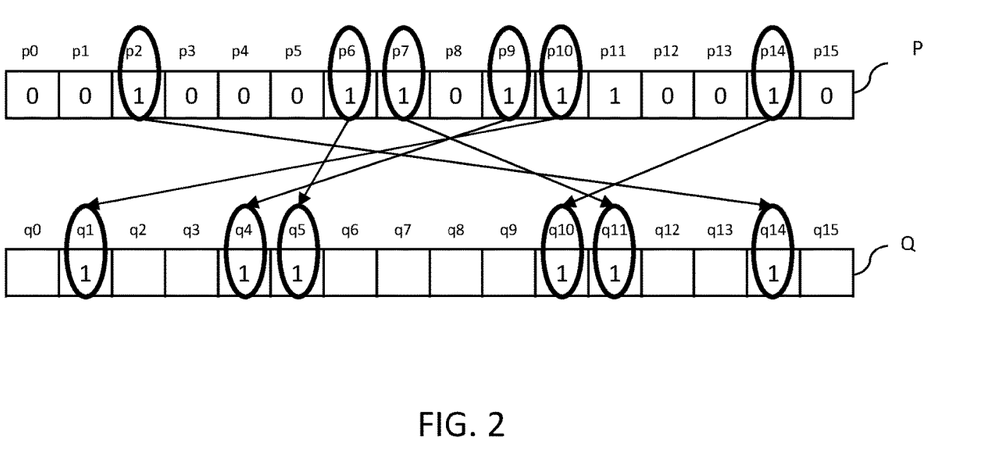
FIG. 2 is a schematic illustration of an exemplary source row from which specific bits should be distributed to a destination row.

FIG. 2, to which reference is now made, is a schematic illustration of a source row P, from which specific bits should be distributed, to a destination row Q. In this example, it is pre-determined that the values of bits stored in cells in addresses p2, p6, p7, p9, p10, and p14 of source row P should be distributed to cells in addresses q14, q5, q11, q4, q1 and q10 of destination row Q, respectively. In other words, the value of a cell located in address p2 should be copied to a cell located in address q14, the value of a cell located in address p6 should be copied to a cell located in address q5 and so on. It may be appreciated that the addresses from which the content of cells should be copied are known in advance and are given as input, i.e., it is predefined that the value in a cell located in address q14 should be taken from the cell located in address p2. It may be noted that the value of cell p11, for example, should not be distributed to any cell in destination row Q.

Figure 3:
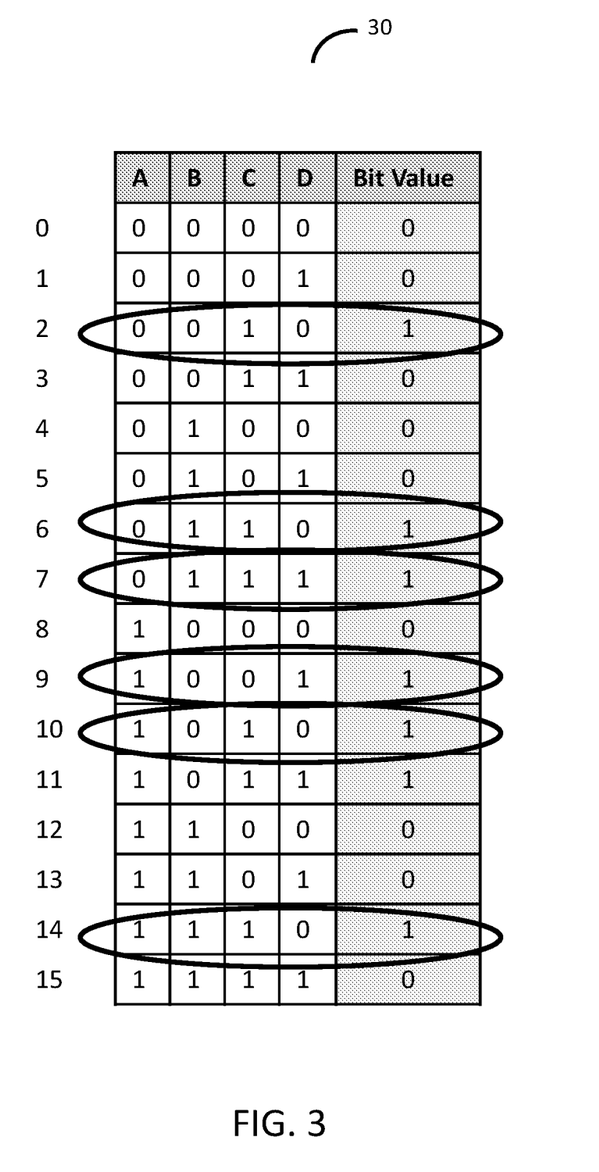
FIG. 3 is a schematic illustration of a truth table representing the correlation between the addresses and the values of source row of FIG. 2.

FIG. 3, to which reference is now made, is a schematic illustration of a truth table 30 representing the correlation between the addresses and the values of row P. In truth table 30, each bit of the source address is an argument. A 4-bit address may represent all relevant address (0000, 0001, ... 1111) of the 16-bit row P and the arguments of the truth table are the four bits of an address, each bit stored in a column: A, B, C and D. The value of the bit stored in each address in row P is stored in the Bit Value column of truth table 30.

The simplest Boolean algebra expression representing the subset of entries in truth table 30 (i.e., entries 2, 6, 7, 9, 10, 14) that should be distributed to new locations is described as a sum of products (SOP) in expression 1:

$$A'B'CD'+A'BCD'+A'BCD+AB'C'D+AB'CD'+ABCD' \quad \text{Expression 1}$$

Each of the products represent an entry in truth table 30. The expression A'B'CD' reflects entry 2 in the table which is address 0010 in row P4. The expression A'BCD' reflects entry 6, A'BCD reflects entry 7, AB'C'D' reflects entry 9, AB'CD' reflects entry 10, ABCD' reflects entry 14 and the sum is the expression that includes only the specified entries. It may be noted that even though the bit value in address 11 in row P is 1, the Boolean algebra expression reflecting this entry in truth table 30 is not part of the final Boolean algebra expression because its bit should not be distributed.

Applicant has realized that devices equipped with a multiple row decoder and a multiple column decoder, such as the ones described in U.S. Pat. No. 9,558,812 (entitled "SRAM multi-cell operations") and U.S. Pat. No. 10,832,746 (entitled "Non-volatile in-memory computing device"), commonly owned by Applicant and incorporated herein by reference, may provide a random distribution of bits from source cells in a source row P to destination cells in a destination row Q.

The distribution may be done by storing the addresses of the source cells in columns of the memory unit, concurrently applying a Boolean algebra operation (mapping the addressees of the source cell to values stored in them) on the columns and storing the results in destination cells of the memory unit.

Figure 4:
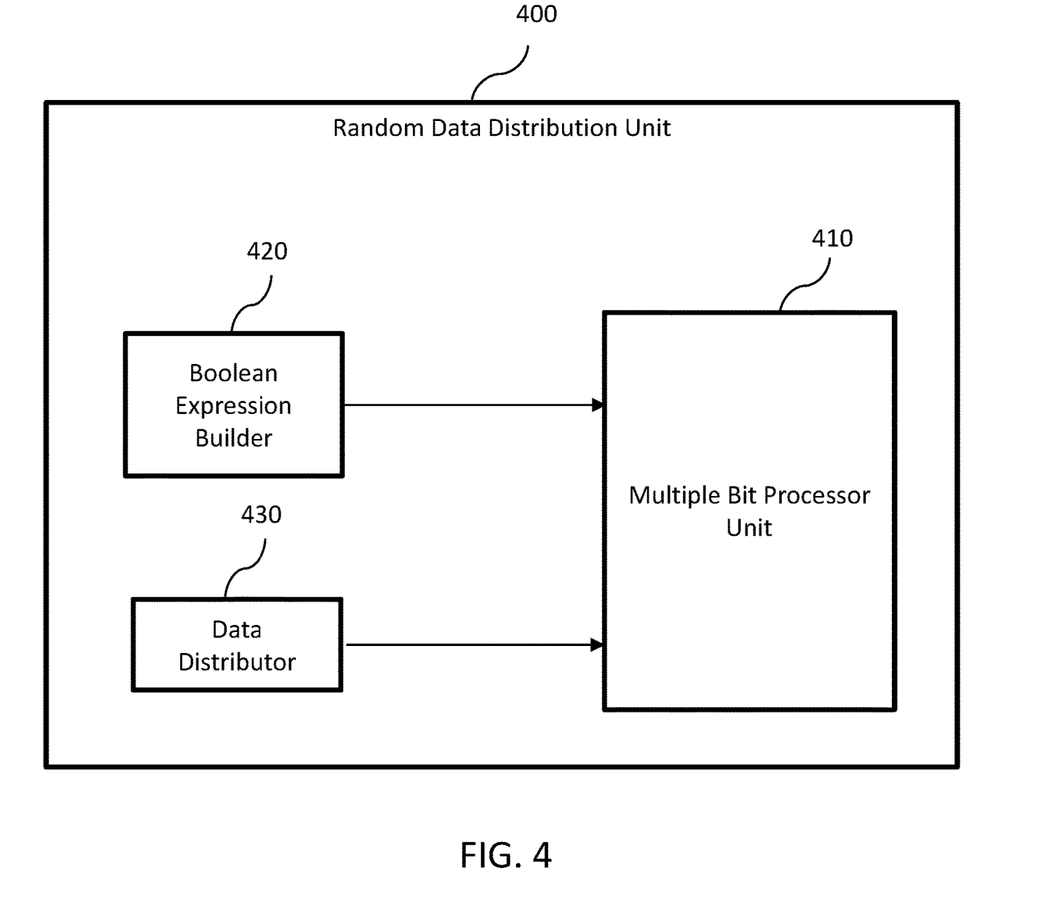
FIG. 4 is a schematic illustration of a random data distribution unit constructed and operative in accordance with an embodiment of the present invention.

FIG. 4, to which reference is now made, is a schematic illustration of a random data distribution unit 400, constructed and operative in accordance with an embodiment of the present invention. Random data distribution unit 400 comprises a multiple bit-processor unit 410, a Boolean algebra expression builder 420 and a data distributor 430.

Figure 5:
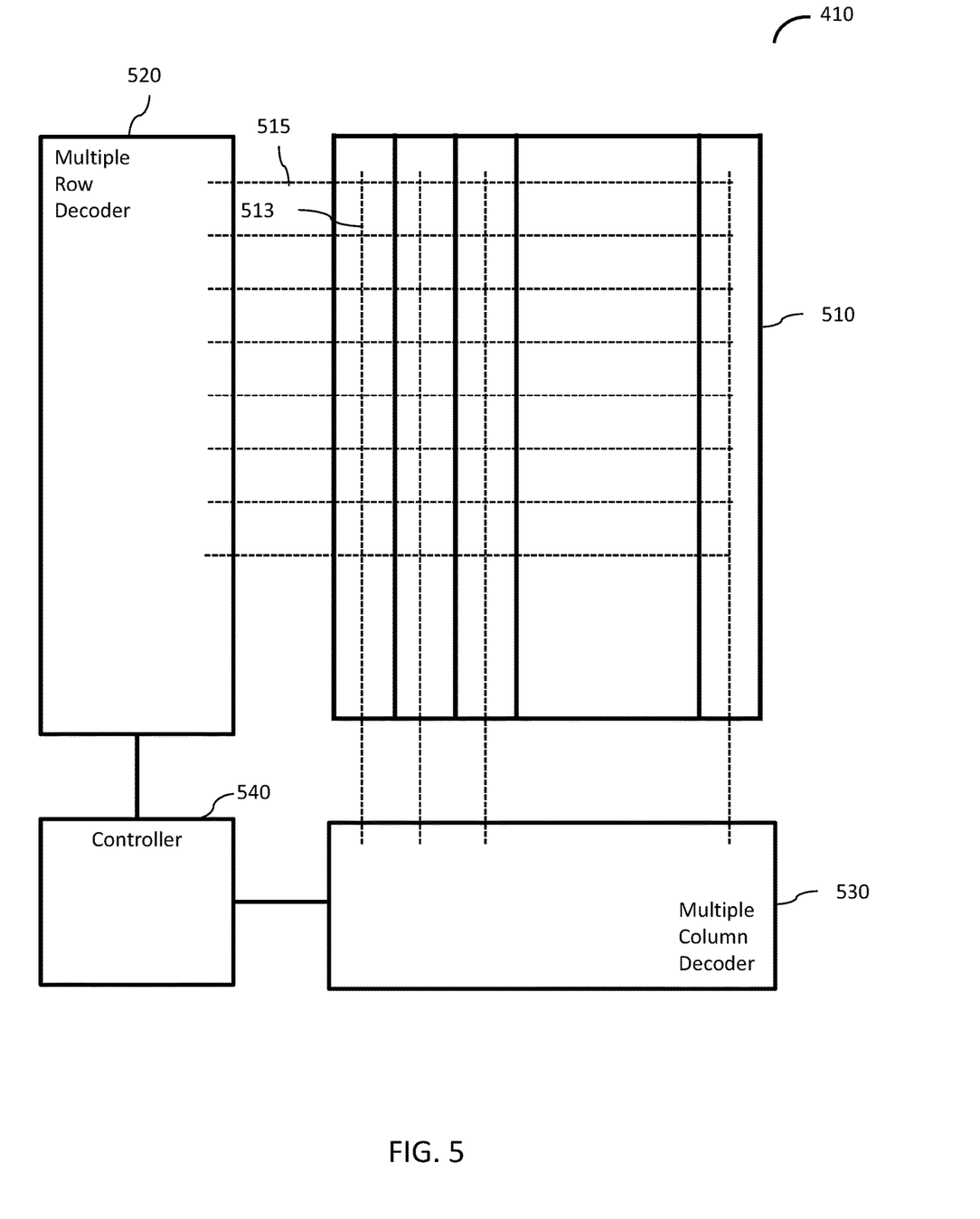
FIG. 5 is a schematic illustration of the multiple bit-processor unit used by random data distribution unit of FIG. 4 constructed and operative in accordance with an embodiment of the present invention.

FIG. 5, to which reference is now made, schematically illustrates multiple bit-processor unit 410 used by random data distribution unit 400. Multiple bit-processor unit 410 comprises a memory array 510, a multiple row decoder 520, a multiple column decoder 530 and a controller 540.

Memory array 510 may be any suitable memory array, volatile or non-volatile (e.g., Resistive random-access memory (ReRAM), 3T DRAM, destructive or non-destructive (e.g., 6T, 8T 10T or 12T SRAM)), and may comprise pure memory cells arranged in rows and columns. The cells in a column may be connected by a bit line 513. The cells in a row may be connected by a word line 515 capable of concurrently activating cells in multiple columns. Data including input, intermediate results and output may be stored in columns of memory array 510.

Multiple row decoder 520 may be any suitable row decoder capable of concurrently activating a plurality of rows. Multiple row decoder 520 may activate two or more rows of memory array 510 at a time.

When multiple rows are activated, selected columns of memory array 510 may provide concurrent computation for the activated rows when a read operation is performed and may provide a concurrent write operation when a write operation is performed.

Multiple column decoder 530 may comprise any suitable column decoder capable of concurrently activating a plurality of columns and any suitable sensing circuitry that may be capable of sensing the value on any bit line connecting cells of a column. Multiple column decoder 530 may provide the result of a Boolean operation applied on multiple cells of each column, concurrently activated by multiple row decoder 520. Multiple column decoder 530 may select which sensed columns to write back to memory array 510 and may be capable of writing the value from a plurality of sensing circuitry components concurrently.

Controller 540 may control the activating of multiple row decoder 520 and multiple column decoder 530. Controller 540 may indicate to multiple row decoder 520 which rows to activate for the current operation, read or write, and may also indicate to multiple column decoder 530 from which columns to write the output back into memory array 510 and the rows to which the data may be written in a selective write operation.

Controller 540 may be in communication with Boolean algebra expression builder 420 and data distributor 430 of random data distribution unit 400, to activate multiple row decoder 520 to implement the Boolean algebra expression produced by Boolean algebra expression builder 420.

Boolean algebra expression builder 420 may receive a source row P and a list of cells in source row P in multiple bit-processor unit 410 from which data should be distributed. Boolean algebra expression builder 420 may create an appropriate truth table (similar to truth table 30) relevant for row P and may create the appropriate Boolean algebra expression applicable for the relevant entries in the truth table (containing only the expressions relevant for the specific cells of source row P that need to be distributed) as described herein above.

Boolean algebra expression builder 420 may utilize an external tool, such the Espresso heuristic logic minimizer, available as source code from the University of California, Berkeley website and from GitHub, to create the Boolean algebra expression representing truth table 30 that describes the correlation between the address and the values of source row P.

Data distributor 430 may first initialize all cells of destination row Q to 0 and then, may concurrently activate multiple cells in multiple columns of multiple bit-processor unit 410 according to the Boolean algebra expression created by Boolean algebra expression builder 420. Data distributor 430 may then write the result of the Boolean algebra operation, as received by multiple column decoder 530, to destination row Q in multiple bit-processor unit 410.

Figure 6:
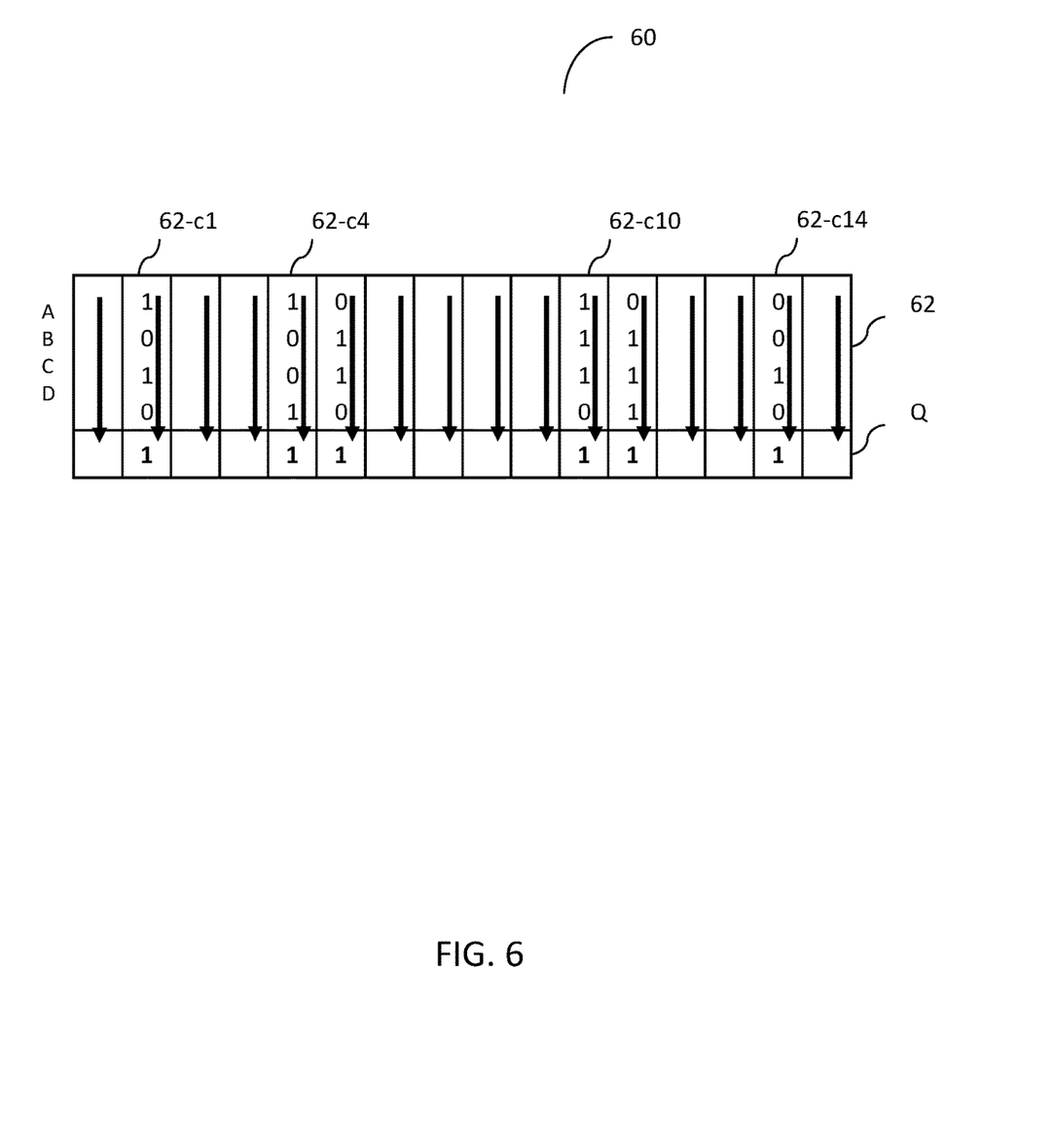
FIG. 6 is a schematic illustration of a portion of a memory array part of multiple bit-processor unit of FIG. 5.

FIG. 6, to which reference is now made, is a schematic illustration of a portion 60 of memory array 510. Rows A, B, C and D of section 62 store the addresses of cells in source row P (e.g., from which bits should be copied, referred to as source addresses). For example, column 62-$c1$ stores the address 1010, and column 62-$c4$ stores the address 1001. Data distributor 430 may activate the relevant rows in the columns of portion 60 to perform the Boolean algebra operations on all activated columns and may write the result received on each column to cells in the same column in row Q. It may be appreciated that the cells storing a source address and the destination cell may be located in the same column as illustrated in FIG. 6.

In an alternative embodiment, the source addresses and destination cell may be located on different columns of multiple bit-processor unit 410 in which case, data distributor 430 may have a configuration associating between each column storing a source address and a column of the relevant destination cell.

In another alternative embodiment, the source cells may be located in different rows of multiple bit-processor unit 410, and Boolean expression builder 420 may have a configuration of the addresses of the source cells from which the Boolean algebra expression should be built.

As mentioned herein above, the source addresses and the destination addresses (to which they should be written) are provided as input and each of the provided source addresses, from which a value should be copied, may be stored directly in a column in the multiple bit-processor unit associated with a destination cell to which the value, stored in the cell pointed by the source address, should be copied.

The multiple bit-processor unit may concurrently perform Boolean operations on a plurality of columns, compute per column the SOP on the address section 62 of portion 60 and store the results in cells of the destination row Q. Each cell in the destination row Q, to which a value should have been copied, has, after the operation of data distributor 430, the value of a relevant source cell, and all other cells have the value 0.

In an alternative embodiment, Boolean algebra expression builder 420 may create a Karnaugh map for creating a simplified Boolean algebra expression from truth table 30. A Karnaugh map is a method of simplifying Boolean algebra expressions.

In Karnaugh maps, the truth table is represented as a two-dimensional grid where the cells are ordered such that two successive values differ in only one bit and each cell position represents one combination of input conditions. Cells in the grid (also known as "minterms") represent the corresponding output value of the Boolean algebra expression (similar to the Bit Value column of truth table 30). Groups of 1s or 0s in the Karnaugh map may be identified and can be used to write a minimal Boolean algebra expression representing the required logic. The SOP created from the Karnaugh map may be simpler than the one created from truth table 30, optionally containing Boolean operations.

Figure 7:
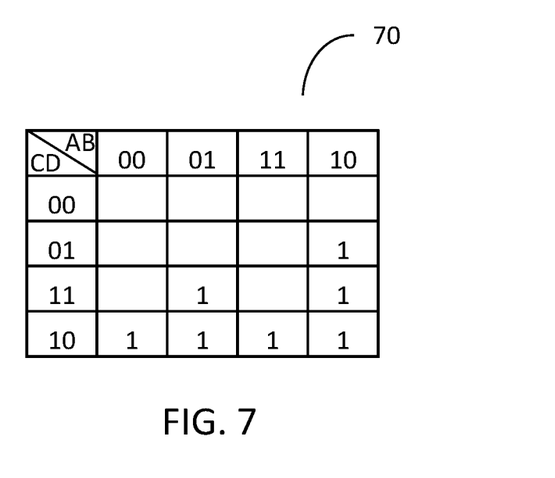
FIG. 7 is a schematic illustration of a matrix representing a Karnaugh map of the truth table of FIG. 3.

FIG. 7, to which reference is now made, is a schematic illustration of a matrix 70 representing a Karnaugh map of truth table 30. In matrix 70, arguments A and B of the address of the cells of row P (columns A and B of truth table 30) are grouped into columns and arguments C and D of the addresses of cells of row P (columns C and D of truth table 30) are grouped into rows. The value stored in the cells of row P (the Bit Value column of truth table 30) is the value of the relevant cell of matrix 70.

Figure 8A:
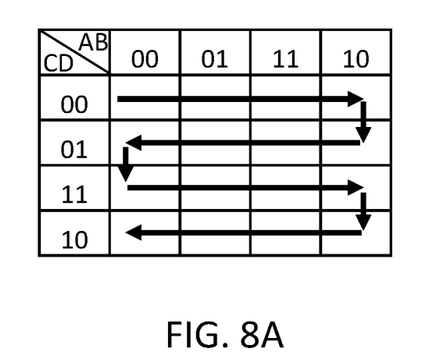
FIGS. 8A and 8B are schematic illustrations of a possible path through the matrix of FIG. 7 for rearranging the addresses and values of the truth table of FIG. 3.
Figure 8B:
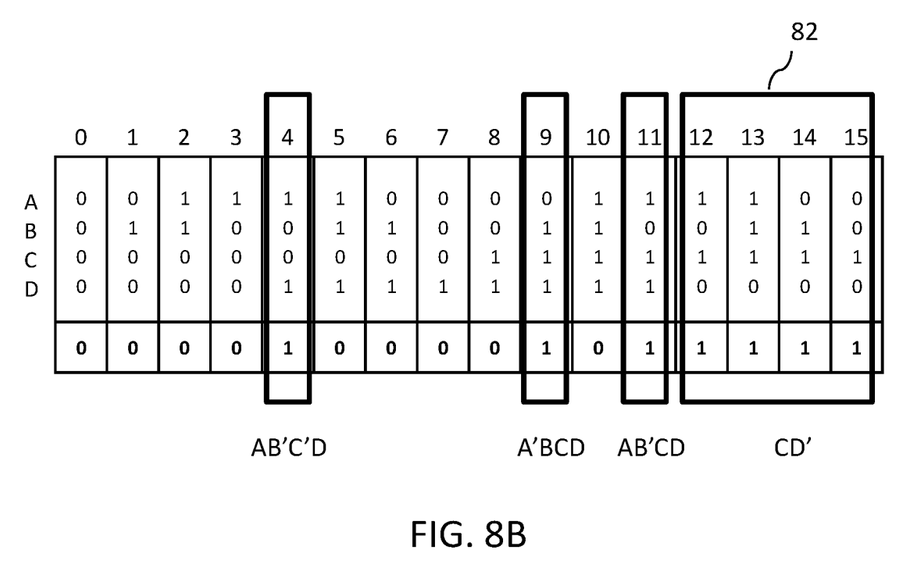

FIG. 8A and FIG. 8B, to which reference is now made, are schematic illustrations of a possible path through matrix 70 for rearranging the addresses and values of row P and storing them in columns of multiple bit-processor unit 410, keeping the distance of 1 bit between consecutive entries.

Using the path illustrated in FIG. 8A, the addresses may be arranged in the following order: 0000, 0100, 1100, 1000, 1001, 1101, 0101, 0001, 0011, 0111, 1111, 1011, 1010, 1110, 0110 and 0010. Boolean algebra expression builder 430 may use this arrangement to create the simplified Boolean algebra expression 2 (below) but it may be appreciated that many other paths can be used to determine the order of the addresses.

Once the addresses are arranged, Boolean algebra expression builder 430 may create a simplified Boolean algebra expression with the arguments that provide the bit value for selected addresses only for computing the bit value for every address of row P. The method of building a Boolean expression using a Karnaugh map is defined in https://en.wikipedia.org/wiki/Karnaugh_map.

The Boolean expression relevant for Karnaugh map 70, is defined in expression 2:

$$AB'C'D+A'BCD+AB'CD+CD' \quad \text{expression 2}$$

Using expression 2 may provide a faster distribution of data from source row P to destination row Q.

Embodiments of the present invention may concurrently distribute the value of multiple bits in one location (in a source row P) to another location in memory without performing multiple shift operations or accessing the memory. Each bit may be concurrently distributed from one address of a source cell to a second address of a destination cell.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for random data distribution in a memory array from a source row to a destination row, the method comprising:
    receiving a plurality of pairs of addresses, wherein each pair includes a source address of a source cell in said source row and a destination addresses of a destination cell in said destination row, wherein in each pair a value stored in said source cell is to be distributed to said destination cell;
    for each one of said plurality of pairs, storing said source address in cells of a column associated with said destination cell;
    creating a Boolean algebra expression defining a correlation between each one of said source addresses and a value stored in each one of said source cells, wherein applying said Boolean algebra expression on any one of said source addresses provides a value of said one of said source cells; and
    concurrently, applying said Boolean algebra expression on a plurality of columns storing said source addresses and concurrently writing a plurality of results on said destination row, thereby distributing data from said source row to said destination row.

2. The method of claim 1 wherein said applying said Boolean algebra expression further comprises concurrently activating a plurality of rows in said memory array.

3. The method of claim 2 wherein said memory array comprises non-volatile memory cells.

4. The method of claim 2 wherein said memory array comprises non-destructive memory cells.

5. The method of claim 1 wherein said cells storing said source address and said destination cell are in a same column of said multiple bit-processor unit.

6. The method of claim 1 wherein said creating a Boolean algebra expression comprises using a Karnaugh map.

7. A system for random data distribution from a plurality of source cells to a plurality of destination cells, the system comprising:
    a memory array comprised of cells arranged in rows and columns;
    a multiple bit-processor unit storing a plurality of source addresses of said plurality of said source cells in a plurality of columns, each source address in a column associated with one of said destination cells;
    a Boolean expression builder to build a Boolean expression describing an association between said source addresses and a plurality of source values stored in said source cells; and
    a data distributor to concurrently activate a plurality of cells on said columns according to said Boolean expression and to write a result provided on each one of said columns to one of said plurality of destination cells associated with said one of said columns.

8. The system of claim 7 wherein said multiple bit-processor unit comprises a multiple row decoder to concurrently select a plurality of rows of said memory array according to said Boolean expression.

9. The system of claim 7 wherein said memory array comprises non-volatile memory cells.

10. The system of claim 7 wherein said memory array comprises non-destructive memory cells.

* * * * *

UNITED STATES PATENT AND TRADEMARK OFFICE
CERTIFICATE OF CORRECTION

PATENT NO. : 12,079,478 B2
APPLICATION NO. : 18/067744
DATED : September 3, 2024
INVENTOR(S) : Avidan Akerib Page 1 of 1

It is certified that error appears in the above-identified patent and that said Letters Patent is hereby corrected as shown below:

In the Claims

In Column 7, Line 24, Claim 1, delete "addresses" and insert --address--.

In Column 8, Line 10, Claim 5, delete "said" and insert --a--.

Signed and Sealed this
Twenty-ninth Day of July, 2025

Coke Morgan Stewart
*Acting Director of the United States Patent and Trademark Office*